Figure 1:
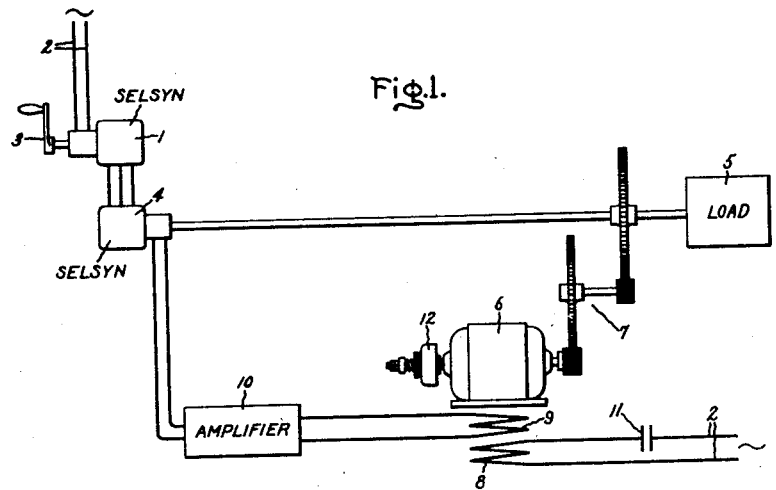

Nov. 30, 1948.　　　　M. SOBELL　　　　2,454,980

DAMPER

Filed May 16, 1945

Inventor:
Morton Sobell,
by Harry E. Dunham
His Attorney.

Patented Nov. 30, 1948

2,454,980

UNITED STATES PATENT OFFICE 2,454,980

DAMPER

Morton Sobell, Schenectady, N. Y., assignor to General Electric Company, a corporation of New York Application May 16, 1945, Serial No. 594,089

5 Claims. (Cl. 74—574)

The present invention relates to a damping device of the type used to damp oscillations of the servomotor of a remote positioning system.

Servo systems for remote positioning of load devices such as searchlights, radio antennas, etc., usually comprise a position-transmitter unit, a follow-up unit connected to the load, a servomotor for driving the load, and control means responsive to a detected deviation in position correspondence or synchronism between the transmitter and follow-up unit for causing the servomotor to operate in a direction to reduce the deviation to zero. The servomotors of such systems have a pronounced tendency to hunt about the synchronized position, and various anti-hunt systems have been utilized to eliminate this hunting. Electrical anti-hunt systems which have been used are complicated, and attempts have been made to devise a mechanical damping device which could be connected directly to the servomotor shaft. Mechanical dampers used heretofore have not, however, provided sufficient damping to permit their use in many applications where rapid synchronization is required. One conspicuous defect in mechanical dampers used heretofore has been their failure rapidly to damp servomotor oscillations initiated by high motor accelerations which arise when the transmitter unit is moved rapidly so as to cause a large transitory departure from the synchronizing condition of the system.

It is accordingly an object of the present invention to provide an improved mechanical damping device for servomotors which will damp oscillations more rapidly under all conditions of operation than mechanical dampers used heretofore.

Another object of the invention is to provide a mechanical damper which is simple, inexpensive, and which can easily be adjusted to accommodate a wide variety of operating conditions.

Further objects and advantages of my invention will become apparent as the following description proceeds and its scope will be pointed out in the appended claims.

Briefly, in accordance with my invention, damping of the servomotor is accomplished by the provision of a viscous-inertia damper which is loosely mounted on the servomotor shaft. The viscous-inertia damper is coupled to the shaft through a friction slip clutch, which normally transmits torque between the shaft and the damper without slipping. However, if for some reason the servo system departs from the synchronized condition a considerable amount so that high servomotor accelerations and torques are developed, the friction clutch slips and limits the maximum torque the damper can exert minimizing overshoot by permitting relative movement between the viscous damper and the motor shaft. With this arrangement rapid synchronization is obtained under all conditions of operation.

Figure 2:
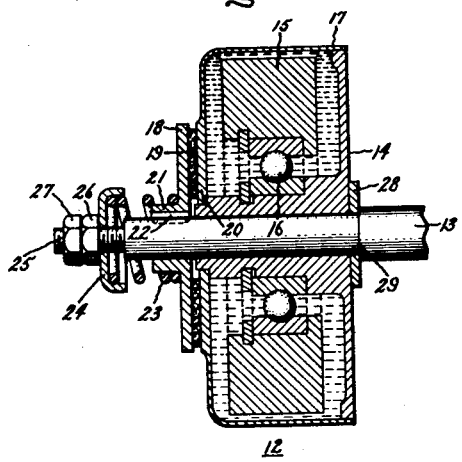

For a better understanding of my invention, reference should be made to the following detailed description taken in connection with the accompanying drawing, in which Fig. 1 is a schematic representation of a conventional servo positioning system comprising a servomotor to which is attached a damping device forming the subject matter of the present invention; and Fig. 2 is a cross-sectional view of the damping device showing constructional details.

Referring to Fig. 1 of the drawing, I have shown a conventional servo positioning system to which the damping device forming the subject matter of the present invention may be applied. The positioning system is shown as comprising a transmitter Selsyn 1, the rotor of which is electrically connected to a suitable source of alternating supply 2, and mechanically connected to a positioning crank 3. The stator of the transmitter Selsyn 1 is electrically connected to the stator of a similar follow-up Selsyn 4, the rotor of which is mechanically connected to a load device 5 which may, for example, be a remotely positioned radio antenna. The load device 5 is rotatably positioned in correspondence with the input crank 3 of the transmitter Selsyn 1 by means of a servomotor 6 which is mechanically connected to the load 5 through a suitable gear reduction 7. The servomotor 6 is illustrated as being a two-phase induction motor, the two-phase windings being illustrated schematically at 8 and 9. The phase winding 8 is connected to the alternating current supply lines 2 while the phase 9 is energized in accordance with the output of the rotor of the follow-up Selsyn 4, which output is amplified by means of a conventional voltage amplifier 10. In order to provide a rotating field in the induction servomotor 6 in a direction dependent upon the polarity of the voltage applied to the phase winding 9, a capacitor 11 is connected in series with the phase winding 8 to shift the phase of the flux produced thereby relative to the flux produced by the control phase winding 9 as will be well understood by those skilled in the art. In operation, any deviation of the angular position of the load device 5 from the position called for by the transmitter Selsyn 1 results in a voltage output from the follow-up Selsyn 4, which causes the servomotor 6 to drive the load into positional correspondence with the transmitter Selsyn. With such a positioning system in the absence of an anti-hunt or damping device, the servomotor tends to hunt back and forth about the synchronized position. In accordance with my invention, such hunting of the servomotor is prevented by the provision of a mechanical damping device 12 which may be, as shown, mounted directly on a shaft extension 13 of the servomotor 6.

Referring to Fig. 2 of the drawing, the damping device 12 comprises what may be termed a viscous inertia damper loosely mounted on the shaft 13, and a friction slip clutch interconnecting the shaft and the viscous-inertia damper. In the illustrated embodiment, the viscous-inertia damper comprises a hub member 14 which is loosely mounted on the motor shaft 13, so that it is free to rotate thereon. Damping inertia is provided by means of a flywheel 15 which is rotatably mounted on the hub 14 by means of a ball bearing 16 so that the axis of rotation of the flywheel is concentric with the shaft 13. The flywheel 15 is enclosed by a liquid-tight casing 17 which is filled with a viscous liquid. The casing is arranged so that the clearance between the side of the casing and the rim of the flywheel is small, being, for example, of the order of .01 inch, so that there is provided a viscous drag coupling between the casing and the flywheel. I have found that the silicone oil having 400 centistokes of viscosity at room temperature functions to give the desired viscous drag coupling. It will be obvious, however, that various other combinations of oil viscosity and clearances may be used to obtain an equivalent drag effect.

The friction slip clutch by means of which the viscous-inertia damper is coupled to the shaft 13 comprises friction plates 18 and 19 which are connected respectively to the shaft 13 and the casing 17. The friction plate 19 is preferably formed of a high friction, non-fibrous material such as an asbestos compound, and is secured to the side wall of the casing in a suitable manner, as by cementing. The side wall 20 of the casing 17 adjacent the friction plate 19 may be thickened as shown to provide additional strength, and thereby preclude the possibility of bending the casing upon the application of high torque. The friction plate 18 is provided with a hub portion 21 which is mounted on and keyed to the shaft 13 by means of a key 22 which is received in an axially extending keyway in the shaft 13. The keyway is made sufficiently long to permit the friction plate 18 to be slid axially on the shaft so that it can be moved into engagement with the coacting friction plate 19.

In order to provide means for biasing the friction plate 18 of the slip clutch into engagement with the coacting friction plate 19 so that torque can be transmitted thereby, there is provided a compression spring 23, one end of which is mounted on the hub 21 and bears against the plate 18. The other end of the compression spring is received in a cup-shaped washer 24 which is mounted on a threaded stud 25 projecting from the end of the shaft 13. An adjusting nut 26 in threaded engagement with the stud 25 bears against one side of the cup-shaped washer 24 and provides a means for adjusting the bearing pressure of friction plate 18 on coacting plate 19, and thereby provides an adjustment for the maximum torque that can be transmitted by the friction slip clutch. As shown, a jam nut 27 may be provided for insuring that the position of the adjusting nut 26 does not change, once it has been set.

In order to prevent the casing 17 from sliding axially on the shaft 13 under the influence of the spring 23, there is provided a backing washer 28 which bears against the hub 14 and is prevented from sliding on the shaft 13 by means of a shoulder 29.

In operation, oscillating motor torques of relatively small magnitude tending to cause the servomotor to hunt are transmitted through the friction slip clutch to the casing 17 of the viscous-inertia damper where they are opposed and dissipated by the resisting force of the flywheel 15, which force is transmitted to the viscous coupling. However, if the positioning Selsyn 1 should be actuated quickly so that the motor 6 develops a relatively high torque, a slipping of the friction clutch occurs so that not all of the motor torque is transmitted to the viscous damper. I have found that this slipping action, which occurs under high torque conditions, greatly increases the speed with which the oscillations of the servomotor are damped after it reaches the synchronized position. I have found from tests that the ratio of the inertia of the flywheel to the inertia of the damper and motor parts directly connected to the motor shaft shoud be high, preferably of the order of 8:1 in order to secure the critical damping. However, advantageous positive damping can be obtained with lower ratios. In order to keep this ratio as high as possible without using an unduly massive flywheel which would undesirably cut down the maximum acceleration of the servomotor, the casing 17 and the associated parts connected thereto should be made as lightweight as possible. For that reason the casing 17 is preferably made of a thin-gauge, easily formed material such as brass.

The adjusting nut 26 provides a means for adjusting the friction slip clutch so that, in any given installation, the maximum torque transmitted by the clutch can be adjusted to a value which gives the best damping for all operating conditions.

In addition to the improved damping action that is obtained, my damping device has the advantage that it is simple, inexpensive to manufacture, and can be easily applied to servomotors of standard design.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A damping device for preventing oscillation of a rotary servomotor comprising a flywheel and means for connecting said flywheel to said motor, said connecting means comprising viscous and friction couplings connected in series relation said flywheel forming an internal part of said viscous coupling which part is driven by viscous contact.

2. In combination with a motor having a shaft, a damping device adapted to be mounted on said shaft comprising a liquid-tight casing having a central opening adapted to loosely receive said shaft, a friction slip clutch connecting said shaft and said casing and a flywheel mounted to rotate within said casing about an axis concentric with said shaft, said casing being filled with a viscous liquid to provide a viscous coupling between said casing and said flywheel, and means for adjusting the maximum torque required to cause a slipping of said friction slip clutch.

3. A damping device adapted to be mounted on the drive shaft of a rotary servomotor to damp oscillations of said motor comprising a liquid-tight casing having a central opening adapted to loosely receive said shaft, a friction slip clutch connecting said shaft and said casing and a flywheel mounted to rotate within said casing about an axis concentric with said shaft, said casing being filled with a viscous liquid to provide a viscous coupling between said casing and said flywheel.

4. Apparatus for damping oscillations of a rotary servomotor comprising a viscous inertia damper loosely mounted on the shaft of said motor, a friction slip clutch interconnecting said shaft and said damper for transmitting torque therebetween, and a coil spring device urging said clutch into engagement for adjustably limiting the maximum torque transmitted by said clutch.

5. Apparatus for damping oscillations of a rotary servomotor comprising a viscous inertia damper loosely mounted on the shaft of said motor, a friction clutch comprising two co-acting friction plates connected respectively to said damper and said shaft, a coil spring coaxially disposed about said shaft for urging said plates into engagement to permit transmission of torque between said shaft and said damper and a member threaded on said shaft for adjusting the force exerted by said coil spring whereby the maximum torque transmitted by said friction clutch may be varied.

MORTON SOBELL.

REFERENCES CITED

The following references are of record in the file of this patent:

UNITED STATES PATENTS

| Number | Name | Date |
|---|---|---|
| 691,667 | Rowland | Jan. 21, 1902 |
| 1,631,982 | Potts | June 14, 1927 |
| 1,719,805 | Hammond | July 2, 1929 |
| 2,019,147 | Loomis et al. | Oct. 29, 1935 |
| 2,198,403 | Canady | Apr. 23, 1940 |
| 2,309,559 | Wemp | Jan. 26, 1943 |

FOREIGN PATENTS

| Number | Country | Date |
|---|---|---|
| 349,906 | Great Britain | May 26, 1931 |